United States Patent [19]

Stanley

[11] Patent Number: 4,903,998
[45] Date of Patent: Feb. 27, 1990

[54] BRANCHED HOSE CONSTRUCTION
[75] Inventor: John H. Stanley, Uniontown, Ohio
[73] Assignee: The Goodyear Tire & Rubber Company, Akron, Ohio
[21] Appl. No.: 238,385
[22] Filed: Aug. 31, 1988
[51] Int. Cl.$^4$ ............................................. F16L 41/00
[52] U.S. Cl. .................................... 285/156; 285/256; 285/423
[58] Field of Search ..................... 285/156, 423, 256
[56] References Cited

U.S. PATENT DOCUMENTS 2,614,304 10/1952 Oetiker ........................... 285/256 X
3,378,282 4/1968 Demler, Sr. ..................... 285/256 X

FOREIGN PATENT DOCUMENTS 286973 4/1987 European Pat. Off. .
0280547 8/1988 European Pat. Off. .

Primary Examiner—Thomas F. Callaghan
Attorney, Agent, or Firm—M. R. Dion, Sr.

[57] ABSTRACT

A branched hose construction contains a rigid insert having at least three legs. There is a plurality of hoses, the number of hoses being equal to the number of legs of the insert. Each hose has one end fitted over a leg of the insert. A securing means secures the hose to the leg. A molded saddle encapsulates the rigid insert and the junction of the hoses.

1 Claim, 3 Drawing Sheets

BRANCHED HOSE CONSTRUCTION

BACKGROUND OF THE INVENTION

This invention relates to an improved branched hose construction.

Hoses are used commonly in motor vehicles, washing machines and other equipment wherein media such as fluids must be conveyed from one part of the device to another. Hoses are commonly made of elastomeric material and may be reinforced. It is often necessary that these hoses cooperate with other hoses and transport or distribute fluids from each. The distribution of fluids takes place where the different hoses meet. This juncture, which often is in the form of a "T", requires some sort of branched hose construction to enable transportation of the fluid without leakage. The fluids conveyed by the hoses are often at elevated temperatures and pressures. The working environment of the branched hose construction can also be hostile, with elevated temperatures, dirt, and vibration. For these reasons, it is important that the branched hose construction maintain a degree of structural integrity to provide leak proof operation.

Recently, the appearance of the branched hose construction has become increasingly important, especially in the automotive industry for use with automotive cooling systems. Manufacturers of automobiles prefer that branched hose constructions have a clean, streamlined appearance in addition to being structurally sound and leak proof.

U.S. Pat. No. 4,648,628 to Dayco Products, Inc. discloses a branched hose construction. Clamping means are used to clamp the hoses against the respective legs of the T-connector. In addition, the legs of the T-connector are formed with annular shoulders so that the end of each hose abuts the shoulder and causes the external peripheral surface of the respective hoses to mate with and be flush with the external peripheral surface of the T-connector. In this way an attractive appearance is obtained while the hoses are clamped against the legs of the T-connector. However, because the clamping means is located on the exterior of each hose, it remains visible and detracts from the appearance of the branched hose construction.

EPO Application No. 243 216 A discloses a flexible hose junction designed for use with automotive applications. A rigid "T" insert cooperates with three hoses in a manner similar to U.S. Pat. No. 4,648,628 previously discussed, except that no clamping means is utilized. Instead, hoses are held against the respective legs of the insert by an external overmolding made of a plastic material. After being molded to the branched hose construction, the overmolding material shrinks at least 1% and presses each hose against its respective branch of the insert. While this type branched hose construction presents an attractive, streamlined appearance, the lack of a clamping means often leads to problems with leakage and a lack of structural integrity.

SUMMARY OF INVENTION

The invention provides a branched hose construction of attractive, streamlined appearance. The branched hose construction has each of its hoses securely clamped to its respective leg of the "T" insert used in the construction. A structurally sound, leak proof junction is obtained as a result.

A branched hose construction according to the present invention has an insert having at least three legs. There are a plurality of hoses, the number of hoses being equal to the number of legs of the insert, with each hose having one end fitted over a leg of the insert. There are means for securing each hose to its respective leg and for providing a seal against leakage from the junction of each hose with such leg. Finally, a molded saddle encapsulates the insert, the means for securing, and the junctions of the hoses with the legs of the insert. The molded saddle helps keep the hoses in proper relation to each other. The saddle also encapsulates each of the means for securing each hose to its respective leg, thereby forming an attractive, streamlined appearance.

DETAILED DESCRIPTION

Figure 1:
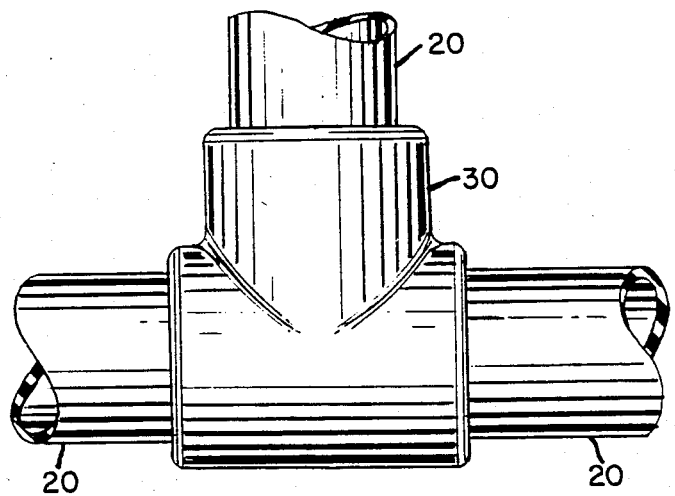
FIG. 1 is a view of the improved branched hose construction of this invention as it would appear to the end user.
Figure 2:
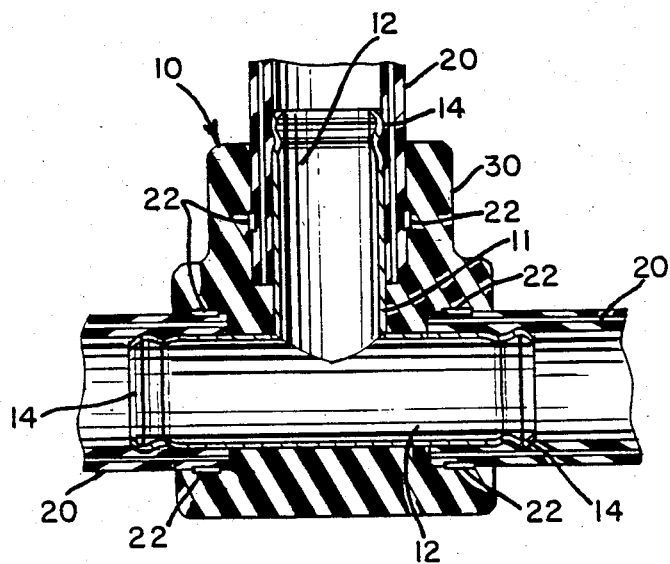
FIG. 2 is a cross-sectional view of FIG. 1, illustrating one embodiment of the improved branched hose construction of this invention.

With particular reference to FIG. 2, there is shown a branched hose construction 10 having an insert 11. The insert preferably is made of any material that is substantially rigid and will not shrink as a result of vulcanization, but is most commonly made of plastic or steel. Some applications have utilized inserts made of nylon. Certain nylon insert designs have deformed under pressures and temperatures of vulcanization and injection molding. The inventor prefers inserts made of steel because steel inserts can withstand such pressures and temperatures.

The insert has at least three legs 12. Commonly, two of the legs have the same center line, with a third leg extending at 90° from the other two legs. A lip 14 may be located at the end of each leg. The lip provides a raised surface to prevent the hose 20 from slipping off the leg 12 once the hose has been fitted over a leg. In the preferred embodiment shown in FIG. 5, no lip is used. Instead, the ends of the legs 12 have grooves 26. The insert 11 is devoid of annular shoulders or flanges adjacent the intersection of the legs 12. An annular compression member, such as the spring clamp 40 shown in FIG. 6, presses the hose 20 into the grooved area, thereby securing the hose to the leg.

The hoses 20 are generally made of an elastomeric material. They can be reinforced with a variety of reinforcing materials such as fabric cords. In the application for which this invention was designed, the hose is reinforced with an aromatic polyamide known by The Goodyear Tire & Rubber Company tradename of "FLEXTEN ™". One end of each hose is associated with each leg of the insert. The hose is fitted over the leg far enough to allow sufficient room for securing the hose to the leg. In the currently preferred embodiment, each leg is approximately one inch long and the hose is fitted over the leg for a distance of about 0.8 inches, thus allowing the material of the molded saddle 30 to surround the annular end surface of each hose 20.

Each hose 20 is secured to its respective leg 12 by one of a variety of securing means. One securing means is an adhesive located on the interface between the hose and the leg. Other securing means compress the hose against the leg of the insert. One means of providing such compressive force is an annular compression member 22 disposed on the outer surface of a hose.

Figure 3:
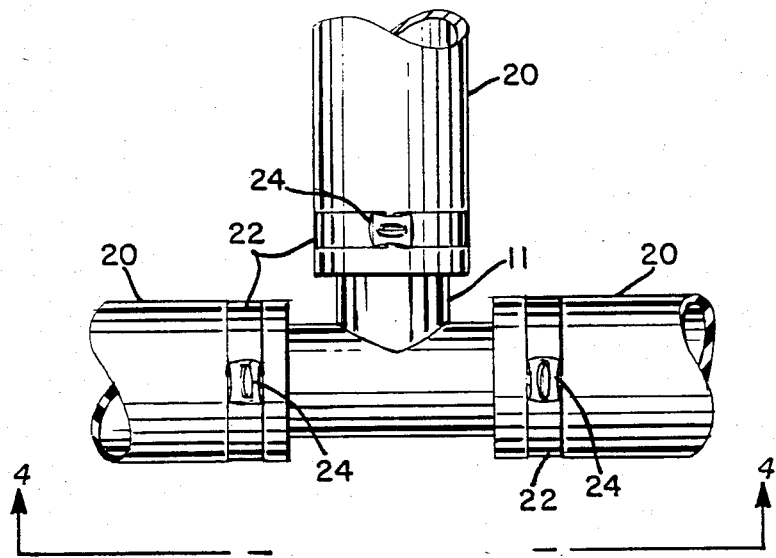
FIG. 3 is a plan view of the improved branched hose construction of this invention with the molded saddle removed to better show the securing means.
Figure 4:
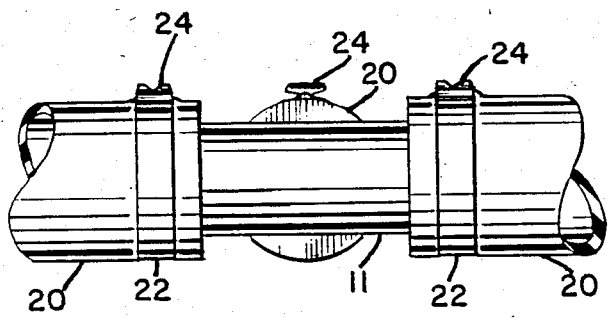
FIG. 4 is an elevational view, as indicated by line 4—4 in FIG. 3, of the improved branched hose construction with the molded saddle removed to better show the securing means.

The annular compression member 22 can be a strip of elastomeric or plastic material that shrinks upon curing, thereby placing a compressive stress on the outermost surface of the hose 20 and compressing the hose against the leg 12. The annular compression member may be a metal wire or strap such as shown in FIG. 3 and FIG. 4. In FIG. 3 and FIG. 4, the branched hose construction is shown with the molded saddle removed to more clearly show the annular compression member 22. In this embodiment, the annular compression member is a flat, band-like strap which is of larger diameter than the hose it secures. A crimping tool is used to pull the band against the surface of the hose and crimp it so that it provides a compressive force on the exterior of each hose forcing it against the respective leg of the insert in a leak proof manner. The area of the band which is crimped is designated 24 in FIG. 3.

Figure 5:
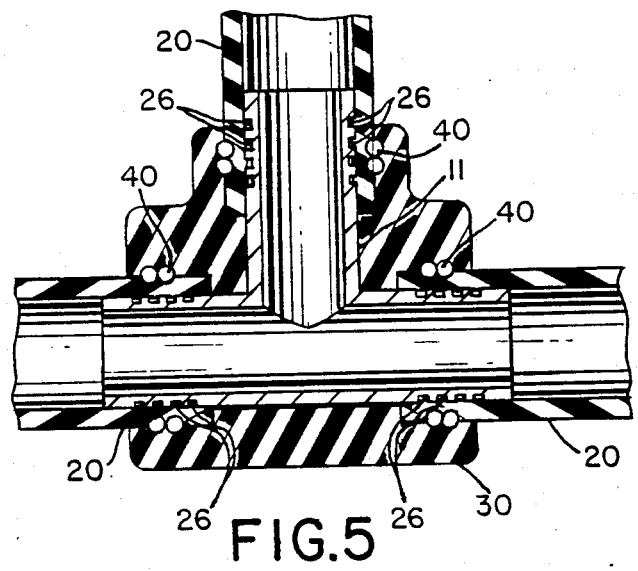
FIG. 5 is a cross-sectional view of another embodiment of the improved branched hose construction of this invention.
Figure 6:
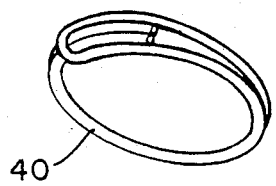
FIG. 6 is a perspective view of a typical spring clamp that could be used with the invention.
Figure 7:
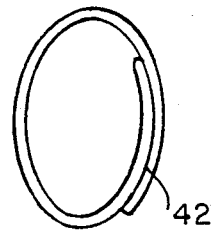
FIG. 7 is a perspective view of another embodiment of a spring clamp that could be used with the invention.

The preferred annular compression member 22 is a spring clamp 40 such as is common in the industry and illustrated in FIG. 6. The preferred spring clamp 42 is shown in FIG. 7. It is preferred because of its low profile. It is preferred that spring clamps be used with inserts such as illustrated in FIG. 5. Such inserts do not have a lip located at the end of the leg 12. Such lip requires that the spring clamp be expanded to a greater diameter to fit over the hose 20. This requirement for greater expansion leads to a decrease in clamping force and increases the potential for leakage.

An adhesive means could be used in addition to and in cooperation with an annular compressive member, but at this time it is not preferred.

A saddle 30 is molded around the junction of the hoses and the insert 11. In the preferred embodiment, the saddle is molded so that the annular compression members 22 are also encapsulated.

The inventor prefers that the saddle 30 is manufactured of an elastomeric material which is transfer molded around the branched hose construction. However, a suitable saddle can be manufactured of plastic material and can be injection molded around the branched hose construction.

The securing means working in conjunction with the molded saddle 30, provides an effective method of sealing the transported fluid within the branched hose connection. The first way leakproof operation is obtained is by the securing means. In most cases, the securing means alone prevents the fluid from leaking from the branched hose construction.

The second way leakproof operation is obtained is by the molded saddle which encapsulates the junctions of the hoses with their respective legs of the insert. The molded saddle provides some degree of compressive force on the hoses. This helps keep the hoses in proper relation to one another. This contributes to greater structural rigidity and lessens the potential for a hose dislodging from its respective leg.

An additional benefit is that the securing means need only be functional, not also aesthetically pleasing. Because the securing means can be encapsulated by an attractive molded saddle, the designer is free to chose the most effective securing means, regardless of its appearance.

Based on the foregoing description of the invention, what is claimed is:

1. A branched hose construction comprising:
   an insert, the insert having at least three legs and being devoid of annular shoulders or flanges adjacent the intersection of the legs; each leg having a lip;
   a plurality of hoses, the number of hoses being equal to the number of legs, each hose having one end fitted over a leg of the insert less than the total length of the leg;
   metallic annular straps, one strap associated with each leg, the metallic straps crimped to apply compressive force to the outer perimeter of the hoses and to press the hoses against their respective legs; and
   a molded saddle encapsulating the insert and the junctions of its legs with the hoses, including the annular end surface of each hose, the saddle also encapsulating each of the metallic annular straps.

* * * * *